(12) United States Patent
Forrester et al.

(10) Patent No.: US 6,281,477 B1
(45) Date of Patent: Aug. 28, 2001

(54) PIZZA DELIVERY BAGS AND METHODS

(75) Inventors: Robert Forrester, Addison; Homero Ortegon, Carrollton, both of TX (US)

(73) Assignee: Pizza Hut, Inc., Dallas, TX (US)

( * ) Notice: Subject to any disclaimer, the term of this patent is extended or adjusted under 35 U.S.C. 154(b) by 0 days.

(21) Appl. No.: 09/569,781

(22) Filed: May 12, 2000

Related U.S. Application Data

(60) Provisional application No. 60/134,277, filed on May 14, 1999.

(51) Int. Cl.$^7$ ........................................................ F24H 7/00
(52) U.S. Cl. ............................ 219/387; 392/339; 206/545
(58) Field of Search ..................................... 219/387, 385, 219/439; 34/80; 392/339; 206/545

(56) References Cited

U.S. PATENT DOCUMENTS

| | | | |
|---|---|---|---|
| 3,721,803 | * | 3/1973 | DiStefano .............................. 219/387 |
| 4,134,004 | * | 1/1979 | Anderson et al. .................... 219/387 |
| 4,751,911 | | 6/1988 | Betts et al. . |
| 4,806,736 | | 2/1989 | Schirico . |
| 4,816,646 | * | 3/1989 | Solomon et al. ..................... 219/387 |
| 4,922,626 | * | 5/1990 | Fiddler ..................................... 34/80 |
| 5,078,050 | | 1/1992 | Smith . |
| 5,128,522 | * | 7/1992 | Marx et al. ........................... 219/385 |
| 5,274,215 | * | 12/1993 | Jackson ................................. 219/439 |
| 5,404,808 | | 4/1995 | Smith et al. . |
| 5,454,471 | | 10/1995 | Norvell . |
| 5,676,051 | | 10/1997 | Sinemus . |
| 5,880,435 | | 3/1999 | Bostic . |
| 5,884,006 | * | 3/1999 | Froblich et al. ...................... 392/339 |
| 5,892,202 | | 4/1999 | Baldwin et al. . |
| 5,981,911 | * | 11/1999 | Miller et al. .......................... 219/387 |
| 5,999,699 | | 12/1999 | Hyatt . |
| 6,018,143 | | 1/2000 | Check . |
| 6,060,696 | * | 5/2000 | Bostic ................................... 219/387 |
| 6,121,578 | * | 9/2000 | Owens et al. ........................ 219/387 |

FOREIGN PATENT DOCUMENTS 2 255 170   10/1992   (GB) .

* cited by examiner

*Primary Examiner*—Teresa Walberg
*Assistant Examiner*—Leonid Fastovsky
(74) *Attorney, Agent, or Firm*—Dicke, Billig & Czaja, P.A.

(57) ABSTRACT

A delivery bag for pizza or other products includes upper, lower, rear, and first and second side panels and a closure flap. The panels and flap are made from a substantially flexible insulating panel material and have interior and exterior surfaces. The panel material is capable of conveying moisture from the interior surface to the exterior surface. The delivery bag also includes one or more pockets fixed to interior surfaces of the panels. A modular heating element is disposed in each pocket. The delivery bag as described advantageously maintains temperatures of pizzas therein, yet allows relative humidity to decline over a specified period of time, thereby preventing e.g. pizza crusts from becoming soggy. Corresponding methods provide similar advantages.

38 Claims, 9 Drawing Sheets

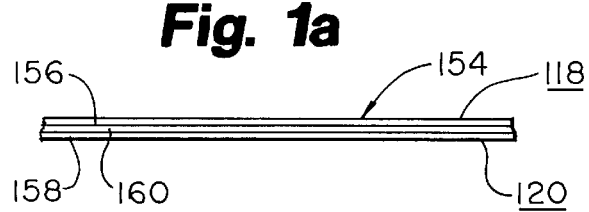
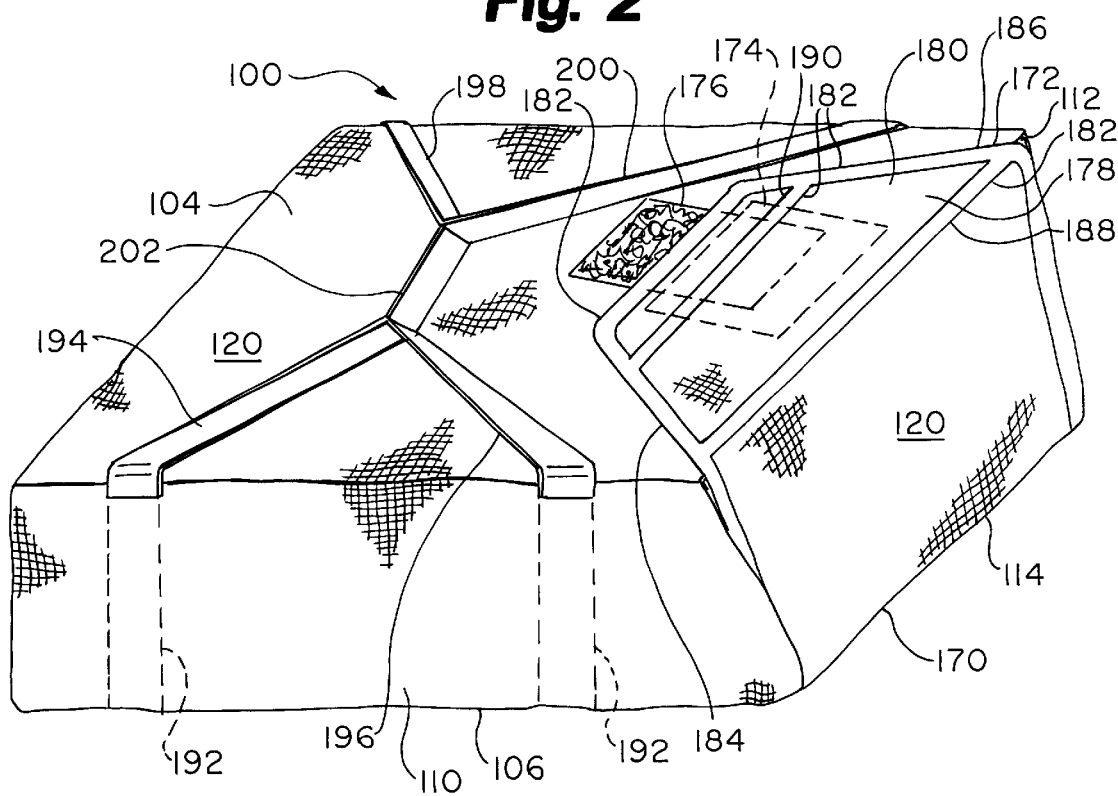

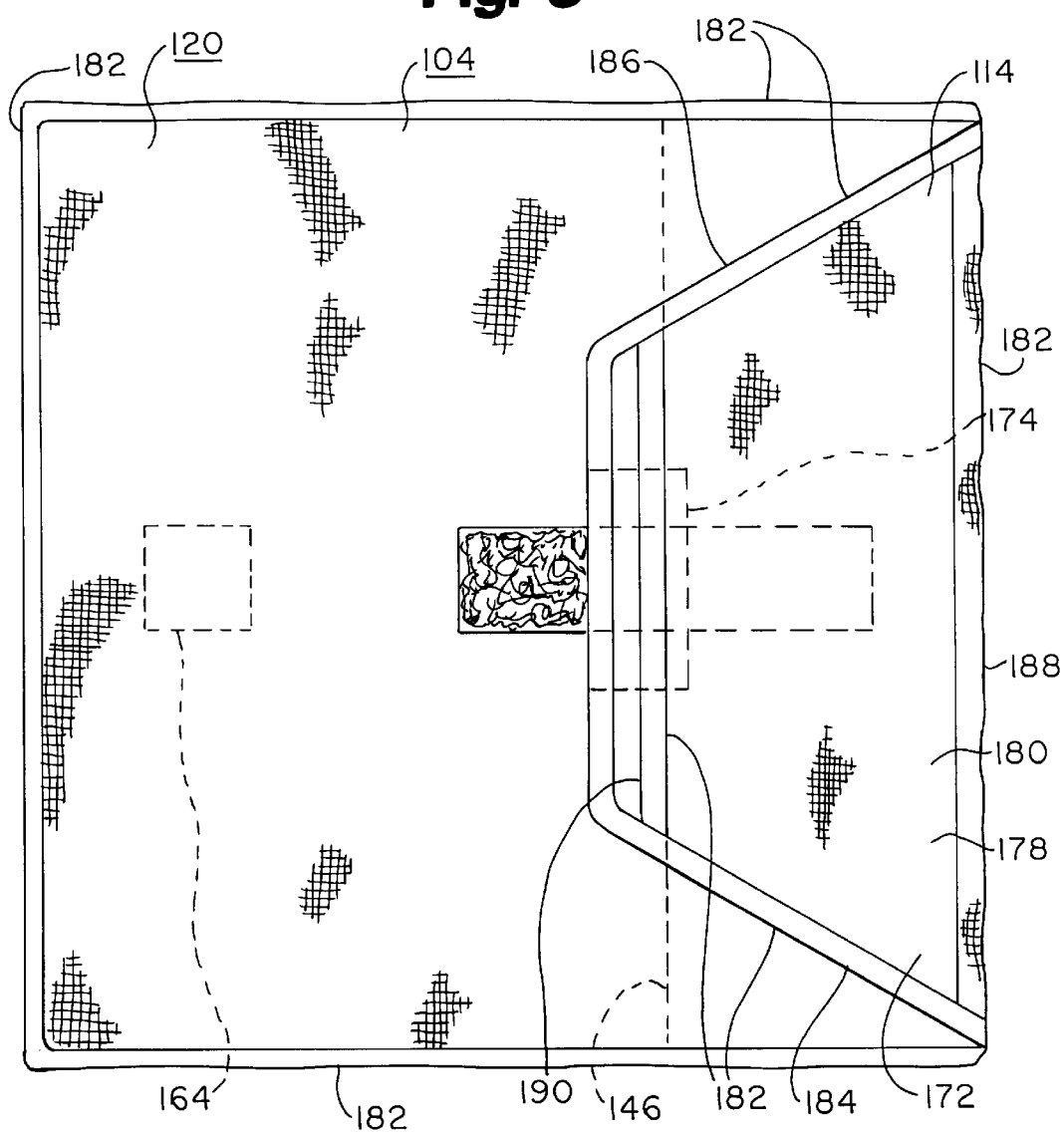

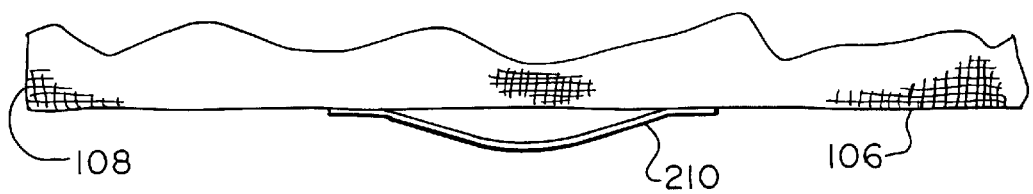
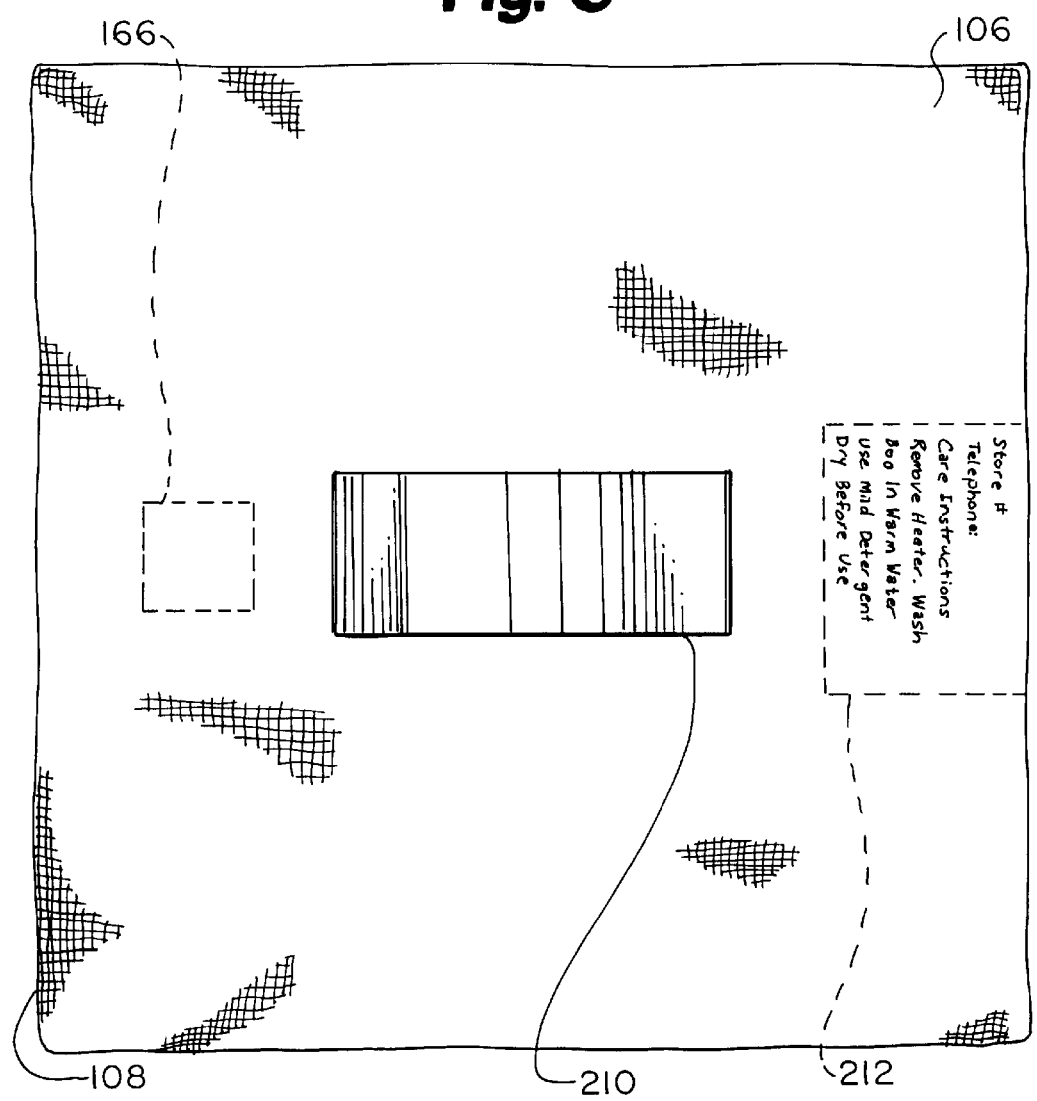

Fig. 6

|  | VINYL | THINSULATE 1 LAYER | POLYESTER 7.5 OZ. | POLYESTER 9 OZ. | POLYESTER 12.33 OZ. |
|---|---|---|---|---|---|
| TEMPERATURE | | | | | |
| @ 20 MIN. | NEUTRAL | -5 | -7 | -4 | NEUTRAL |
| @ 40 MIN. | NEUTRAL | -12 | -4 | +3 | +3 |
| HUMIDITY | BAD | BAD | GOOD | GOOD | GOOD |

|  | POLYESTER 2.0SF(18) | PT150 2 LAYERS | THL3 2 LAYERS | US200 2 LAYERS |
|---|---|---|---|---|
| TEMPERATURE | | | | |
| @ 20 MIN. | -10 | NEUTRAL | -3 | -4 |
| @ 40 MIN. | -4 | +5 | +2 | NEUTRAL |
| HUMIDITY | GOOD | GOOD | GOOD | GOOD |

Fig. 7

| *PIZZA TEMPERATURE | 10 MIN | 20 MIN | 30 MIN | 40 MIN | |
|---|---|---|---|---|---|
| - TOP PIZZA (*F) | 169 | 163 | 160 | 159 | (MAINTAINS) |
| - BOTTOM PIZZA (*F) | 184 | 173 | 167 | 165 | |

Fig. 8
PRIOR ART

| *PIZZA TEMPERATURE | 10 MIN | 20 MIN | 30 MIN | 40 MIN | |
|---|---|---|---|---|---|
| - TOP PIZZA (*F) | 153 | 144 | 139 | 132 | (CONTINUES |
| - BOTTOM PIZZA (*F) | 161 | 153 | 148 | 143 | TO FALL) |

| TIME (MIN.) | BOTTOM TEMP | TOP TEMP | REL. HUMIDITY |
|---|---|---|---|
| 0 | 157 | 164 | 100% |
| 10 | 149.7 | 151 | 100% |
| 20 | 147.8 | 150.5 | 100% |
| 30 | 143.8 | 149.9 | 100% |
| 40 | 139.7 | 147.7 | 100% |

| TIME (MIN.) | BOTTOM TEMP | TOP TEMP | REL. HUMIDITY |
|---|---|---|---|
| 0 | 160 | 165.6 | 100% |
| 10 | 160 | 157 | 100% |
| 20 | 159.3 | 156 | 68% |
| 30 | 158.9 | 154.1 | 60% |
| 40 | 157.6 | 152.3 | 55% |

PIZZA DELIVERY BAGS AND METHODS

CROSS-REFERENCES TO RELATED APPLICATION

This subject matter of this application is related to the subject matter of U.S. patent application Ser. No. 60/134,277, filed May 14, 1999, priority to which is claimed under 35 U.S.C. § 119(e) and which is incorporated herein by reference.

BACKGROUND OF TIE INVENTION

1. Field of the Invention

The invention relates to portable containers for delivering food products, such as pizzas, from a central location to one or more remote locations. More specifically, the invention relates to pizza delivery bags constructed to maintain internal atmospheric characteristics, such as temperature and humidity, at desired levels.

2. Description of Related Art

Bags for enclosing and transporting food items, such as pizza, are known in the art. These bags typically accommodate one or more food items to be delivered to a delivery site at a remote location. The food items are usually packaged, e.g., in cardboard boxes, before being inserted into the bag. The bags are used primarily to keep the food products warm while enroute from where they are prepared to the delivery site.

U.S. Pat. No. 6,018,143, issued Jan. 25, 2000 to Check, and incorporated herein by reference, discloses a portable, thermal bag for containing a food product, such as pizza. The bag has top and bottom panels and is closed along both sides at the rear end. The front end of the bag is open to permit insertion and removal of the food product. The top and bottom panels each have an outer cover layer, an inner cover layer, and electric resistance wires between the cover layers. The resistance wires may be plugged into the cigarette lighter of a delivery vehicle to keep the food product warm. A thermostat is placed at the center of the top panel to control the temperature. The bag has a quick release connector, which may also be plugged into a low voltage transformer in a restaurant where several bags may be kept before being used to carry a pizza in a delivery vehicle.

U.S. Pat. No. 5,892,202, issued Apr. 6, 1999 to Baldwin et al., and incorporated herein by reference, discloses a carrying case for storing and transporting heated articles. The carrying case includes a thermal storage assembly having a heat retention member and a heating coil assembly. The heat retention member absorbs and retains sensible heat and releases the sensible heat for an extended time period.

U.S. Pat. No. 5,880,435, issued Mar. 9, 1999 to Bostic, and incorporated herein by reference, discloses a food delivery container. The food delivery container includes a heating element with a phase change material, such as an ultra-high molecular weight polyethylene. The ultra-high molecular weight polyethylene transforms from a solid to a semi-solid at approximately 248–275° F. The heating element includes a rigid envelope which is permeable to prevent gaseous build up during heating. The heating element, when placed within a suitable insulated container, will maintain food warm for several hours during storage or delivery. An electric resistance grid may be provided for supplying heat energy.

U.S. Pat. No. 5,676,051, issued Oct. 14, 1997 to Sinemus, and incorporated herein by reference, discloses a heated warming apparatus for food products. The apparatus includes one or a plurality of food containers, a housing, and a hot-air fan. The housing accommodates the food containers. The hot-air fan discharges air through a discharge opening in the housing. In order to maintain food products at a sufficiently high temperature, the hot air is heated extensively. However, the objective of reduced heating power expenditure is achieved by providing each food container with one or a plurality of inlet holes and one or a plurality of outlet holes. Each food container is arranged in the housing such that at least one of its holes is in fluid communication with the discharge opening.

U.S. Pat. No. 5,404,808, issued Apr. 11, 1995 to Smith et al., and incorporated herein by reference, discloses a carrier for hot food. In this carrier, a volume of dehumidifier material, such as calcium sulfate, is heated to a temperature greater than the pre-determined serving temperature of the food product and positioned in heat exchange relation with the food product, such that heat is transferred from the heated dehumidifier material to the food product and such that moisture is transferred from the food product to the dehumidifier material.

U.S. Pat. No. 5,078,050, issued Jan. 7, 1992 to Smith, and incorporated herein by reference, discloses a hot plate carrier. The carrier is disclosed as being for a partially baked dough product having a bottom crust and a moist topping. The carrier includes a vented container and a heater. The vented container contains the partially baked dough product. The heater is adapted to initially heat the bottom of the partially baked dough product to a temperature greater than 250° F. to finish baking the crust of the dough product and maintain the temperature of the crust greater than the temperature of the moist topping. The vented container is formed to exhaust moist air from the interior of the container while maintaining the temperature of air adjacent to the moist topping on the dough product at above the dew point of air in the container to prevent moisture condensation and to draw air from outside the container to expel moisture from adjacent the bottom crust.

U.S. Pat. No. 4,806,736, issued Feb. 21, 1989 to Schirico, and incorporated herein by reference, discloses a heated delivery bag (portable container) for heating and storing pizza. The heated delivery bag includes a fabric box about 20 inches long, about 20 inches wide, and about 8 inches high. The box is supported in its four vertical corners by plexi-glass strips positioned inside sleeves. A lower rigid panel is located at the bottom of the fabric box. The lower rigid panel is used to support a heating unit. An upper rigid panel located above the heating units forms a compartment with the sides and top of the fabric box large enough to contain two pizzas in their delivery box containers. The heating unit includes an aluminum pan. The aluminum pan contains a block of insulation with a ½ inch depression on its upper surface. A silicone rubber heating element is positioned inside this depression. The temperature inside the portable container is maintained at between 165–180° F. The portable container can be carried with one hand when used for delivering hot pizzas.

The devices referenced above generally are intended to transport food from a first location to a second location. However, devices according to the prior art are not believed to be constructed of materials that allow relative humidity within the bag to decrease in an optimal fashion or otherwise provide optimal humidity characteristics. Further, these devices suffer an inability to readily remove and/or replace heating elements associated therewith, e.g. during cleaning or in the event of heating element failure. Still further, none are believed to easily and inexpensively allow ready interchangeability of the heating elements, for use in more than one bag and/or in multiple locations. A need has arisen to address these and other problems.

SUMMARY OF THE INVENTION

Embodiments of the invention substantially meet the aforementioned and other needs of relevant industries by providing a portable container, e.g. a pizza delivery bag, and a method of use, in the manner described in this application.

According to one aspect of the invention, a portable container for transporting food comprises an enclosure, the enclosure having an openable section, the openable section being movable from an open position, in which food can be placed into the enclosure for transport and in which food can be removed from the enclosure, and a closed position. At least one pocket is connected to the enclosure, and at least one modular heating element is disposed within the at least one pocket. The at least one modular heating element is readily removable from the pocket for use in a different, generally identical portable container, and the at least one modular heating element provides thermal energy to food disposed within the enclosure.

The enclosure is constructed to allow passage of moisture therethrough, and/or to wick moisture from the inside of the enclosure to the outside of the enclosure. The at least one modular heating element is constructed to allow passage of moisture therethrough. The at least one modular heating element is powered by electricity, and further comprises a power cord extending out of the container for connection to a source of electricity. The container comprises a plurality of pockets connected to the enclosure, at least one modular heating element being disposed within each of the plurality of pockets, the modular heating elements being readily removable from the respective pockets.

According to another aspect of the invention, a method of transporting food in a portable container comprises providing an enclosure, the enclosure having an openable section, the openable section being movable from an open position, in which food can be placed into the enclosure for transport and in which food can be removed from the enclosure, and a closed position, moving the openable section to the open position, placing food within the enclosure for transport, providing at least one pocket connected to the enclosure and at least one modular heating element disposed within the at least one pocket, the at least one modular heating element being readily removable from the pocket, and providing thermal energy to food disposed within the enclosure with the at least one modular heating element. The method further includes removing the at least one modular heating element from the pocket, and placing the at least one modular heating element in a pocket of a different, generally identical portable container.

According to another aspect of the invention, a portable container for transporting food comprises means for enclosing food, the means for enclosing comprising means for opening such that food can be placed within the means for enclosing and can be removed from the means for enclosing, and means for accommodating modular means for heating, the means for accommodating being connected to the means for enclosing, the means for accommodating being constructed such that modular means for heating is readily removable from the means for accommodating for use in a different, generally identical portable container.

According to another aspect of the invention, a portable container for transporting food comprises an enclosure, the enclosure having an openable section, the openable section being movable from an open position, in which food can be placed into the enclosure for transport and in which food can be removed from the enclosure, and a closed position, and at least one heating element for providing thermal energy to food within the enclosure, wherein the enclosure is constructed to allow passage of moisture therethrough, further wherein the enclosure and the at least one heating element are constructed such that relative humidity within the enclosure decreases from about 100% at a first time point to between about 50% and about 60% at a time point about 40 minutes after the first time point while the openable section remains in the closed position.

According to another aspect of the invention, a portable container for delivering food comprises an upper panel, a lower panel, a rear panel, a first side panel, a second side panel, and a closing flap, wherein said rear panel, said first side panel and said second side panel all extend between said upper panel and said lower panel, further wherein at least said upper panel, said lower panel, said rear panel, said first side panel, and said second side panel all comprise a substantially flexible and moisture-permeable insulating panel material and all define interior and exterior surfaces, and a first pocket defining a first pocket opening and disposed proximate the interior surface of at least one of the upper, lower, rear, and first and second side panels.

A modular heating element preferably is disposed in the first pocket. The panel material and the heating element cooperate such that relative humidity within the container decreases from about 100% to between about 40% and about 60% over a time period of about 40 minutes while the closing flap is in a closed position. Additionally, the panel material and the heating element preferably cooperate such that temperature within the container decreases by no more than about 10 Fahrenheit degrees in a time period of about 40 minutes while the closing flap is in a closed position.

According to another aspect of the invention, the panel material and the heating element cooperate such that relative humidity within the container decreases from about 100% to between about 55% and about 70% over a time period of about 40 minutes while the closing flap is in a closed position. According to another aspect of the invention, the panel material and the heating element cooperate such that relative humidity within the container decreases from about 100% to between about 55% and about 60% over a time period of about 40 minutes while the closing flap is in a closed position. According to another aspect of the invention, the panel material and the heating element cooperate such that relative humidity within the container decreases from about 100% to about 55% over a time period of about 40 minutes while the closing flap is in a closed position.

The panel material preferably includes an interior fabric, an exterior fabric, and an insulating fabric disposed between the interior and exterior fabrics. The interior and exterior fabrics comprise nylon and the insulating fabric comprises polyester.

The container preferably comprises a second pocket, the second pocket defining a second pocket opening, the first pocket disposed proximate the interior surface of the lower panel, the second pocket disposed proximate the interior surface of the upper panel. First and second modular heating elements are disposed in said respective first and second pockets. The first and second modular elements are vapor-permeable. The first pocket opens toward the rear panel. A fastener portion is disposed in the first pocket and fixed to the interior surface of said at least one panel. The fastener portion preferably is a hook portion of a hook-and-loop fastener or a loop portion of a hook-and-loop fastener.

According to another aspect of the invention, a method of maintaining a pizza at a desired temperature and moisture content during delivery comprises providing a portable container, the container including an upper panel, a lower panel, a rear panel, first and second side panels, a closing flap, a pocket and a modular heater, said rear and first and second side panels extending between the upper panel and the lower panel, the flap extending from the lower panel, the upper, lower, rear, first and second side panels and flap including a substantially flexible insulating panel material including interior and exterior surfaces, the panel material capable of allowing moisture to pass from an interior of the container to an exterior of the container, the pocket defining a pocket opening and disposed proximate the interior surface of one of the upper, lower, rear, and side panels, the modular heater disposed in the pocket, placing the pizza in the container, closing the flap, providing electricity to the modular heater, and maintaining a desired temperature and moisture content within the portable container.

A pair of pizzas are placed in the container, according to one embodiment. The method preferably further comprises decreasing relative humidity within the container to between about 40% and about 60% over a time period of about 40 minutes while the flap is closed. According to another aspect, the method further comprises decreasing relative humidity within the container to about 55% over a time period of about 40 minutes while the flap is closed.

It is an object of this invention to provide a portable food container for maintaining prepared food products such as pizza at a desired temperature by using an easily and inexpensively replaceable modular heater. It is another object of this invention to provide a portable food container for maintaining prepared food products such as pizza at a desired temperature by using a modular heater so that the container need not be discarded when the heater needs to be replaced.

It is another object of this invention to provide a portable food container that is made of materials allowing excess moisture from the food products to pass through the material from the container interior to the container exterior. It is another object of this invention to maintain desired moisture content of prepared food products by decreasing the relative humidity within the container.

It is yet another advantage of this invention to provide a portable container constructed primarily with breathable or gas- and/or vapor-permeable materials, to allow substantial vapor/humidity to escape from the interior thereof without undesirable heat loss. Additional objects, advantages, and features of various embodiments of the invention will become apparent to those skilled in the art from the description that follows.

BRIEF DESCRIPTION OF THE DRAWINGS

Embodiments of the invention are illustrated in the accompanying figures, in which like reference numerals denote like elements and in which:

FIG. 1a is a fragmentary cross-sectional view of a portion of the FIG. 1 delivery bag;

FIG. 2 is a side perspective view of the FIG. 1 delivery bag;

FIG. 3 is a top view of the FIG. 1 bag;

FIG. 4 is a partial side view of the FIG. 1 bag;

FIG. 5 is a bottom view of the FIG. 1 bag;

FIG. 6 is a table showing temperature and humidity characteristics for a variety of insulation materials;

FIG. 7 is a chart showing lab-test characteristics for a bag according to an embodiment of the invention;

FIG. 8 is a chart showing lab-test characteristics for a prior art bag;

DETAILED DESCRIPTION OF PREFERRED EMBODIMENTS

Figure 1:
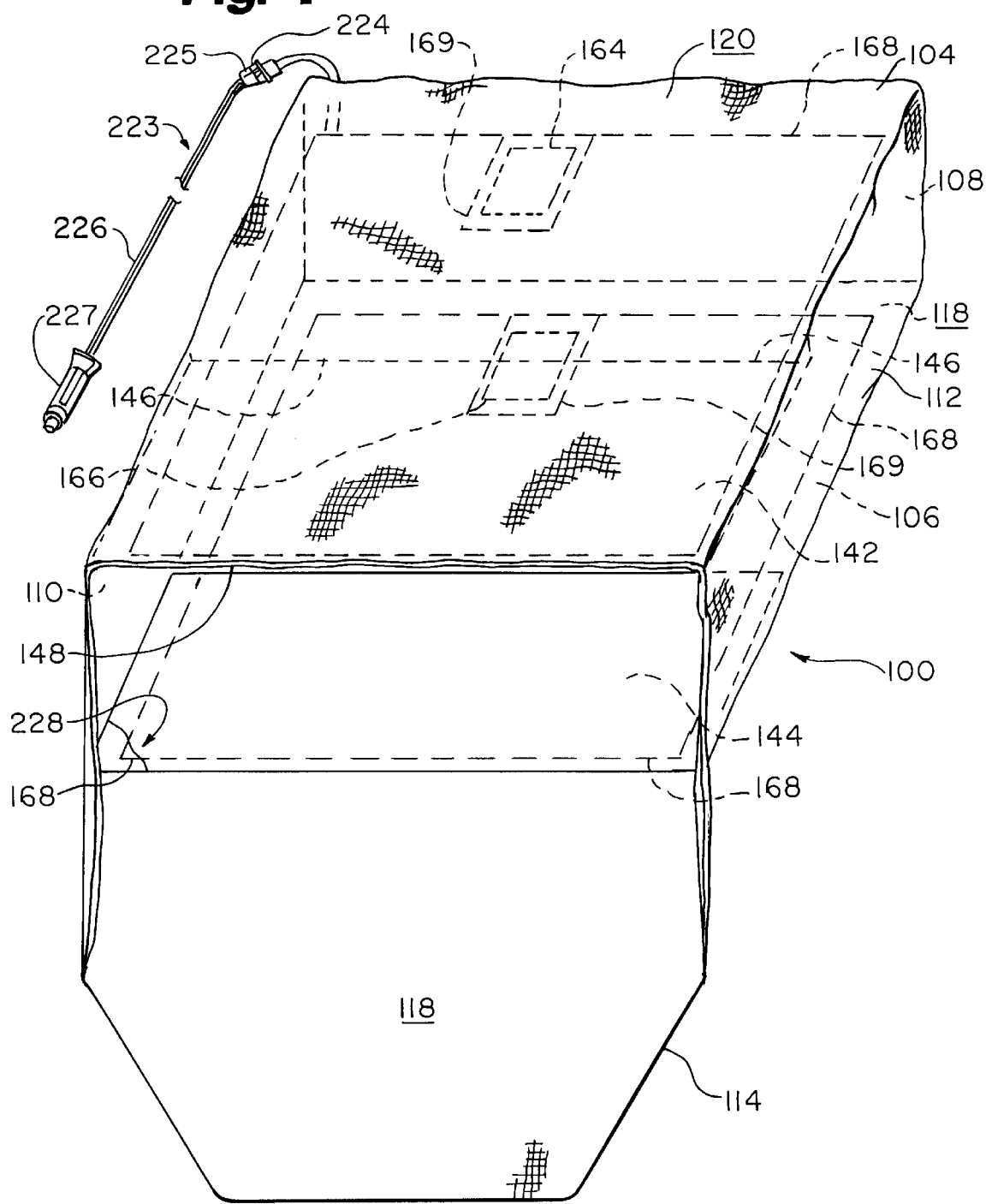
FIG. 1 is a front perspective view showing a pizza delivery bag according to an embodiment of the invention.

One embodiment of a pizza delivery bag according to the invention is depicted in FIGS. 1–5, generally at 100. Delivery bag 100 includes upper panel 104, lower panel 106, rear panel 108, respective first and second side panels 110 and 112, and an openable section, i.e. a closure flap, 114. Each panel 104–112 and closure flap 114 have an interior surface 118 and an exterior surface 120. Delivery bag 100 thus generally defines an enclosure into which food can be placed through the openable section, e.g. at a pizza restaurant or other baking facility, transported to a remote location, such as a customer's place of residence, and then removed from the enclosure. Although this application may emphasize pizza products and pizza delivery environments, it should be noted that embodiments of the invention are equally applicable to food items other than pizza, non-food items, and/or environments other than delivery environments.

Delivery bag 100 also includes upper and lower pockets 142, 144, shown in dotted line representation in FIG. 1. Upper and lower pockets 142, 144 are formed from material affixed to interior surfaces of upper and lower panels 104, 106, according to the illustrated embodiment. Upper and lower pockets 142, 144 form respective openings 146, 148 through which one or more objects can be placed into the pockets, as will be described later in this application. Of course, one or more pockets may be present in only one of upper and lower panels 104, 106, and/or in one or more of rear panel 108, first side panel 110, and second side panel 112. Additionally, or alternatively, the one or more pockets can be placed adjacent an exterior surface of bag 100 instead of the interior surface.

Pockets 142, 144 in this embodiment extend substantially the full width of the upper and lower panels 104 and 106 and a substantial portion of their length, e.g. about 6 inches. Pockets 142, 144 also open toward rear panel 108, according to this embodiment. According to this construction, the heating elements are less likely to fall out of the bag. Further, when sliding a pizza box or other food container or food item into the bag, the box is far less likely to "catch" on the pocket or on the heating element itself, reducing the likelihood of bunching the pocket or the heating element e.g. in an "accordion-like" manner, or catching a heating element and driving it towards the rear of the bag. Referring to FIG. 1a, exemplary panels 104–112 and closure flap 114 are formed from material 154. Material 154 includes interior fabric layer 156, exterior fabric layer 158, and insulating fabric layer 160. These layers preferably are moisture-permeable, yet cooperate and insulate to retain heat within the interior of delivery bag 100 in a manner to be described further.

Inner fabric layer 156, according to one embodiment, can be a moisture-permeable material, such as 210 denier nylon with a ¾ ounce polyurethane-backed DMR finish. Exterior fabric layer 158 can be a moisture-permeable, 420 denier nylon, also with a ¾ ounce polyurethane-backed DMR finish. In one embodiment, insulation layer 160 is characterized as 12.33 ounces per square yard polyester fiber fill. The material forming upper and lower pockets 142, 144 is a moisture-permeable nylon, such as the fabric used in exterior fabric layer 158. However, in other embodiments, the material used for interior fabric layer 156 may be used as well. Alternatively, all three layers of the material 154 can be used to form upper and lower pockets 142, 144.

Returning to FIG. 1, bag 100 also includes respective upper and lower fastening portions 164, 166, each being e.g. one-half of a typical hook-and-loop fastening mechanism such as that sold under the trademark VELCRO. Of course, other types of fastening mechanisms are contemplated as well. Fastening portions 164, 166 are disposed on interior surfaces 118 of upper panel 104 and lower panel 106. Portions 164, 166 also can be entirely or partially within upper and lower pockets 142, 144, if desired. As will be described, portions 164, 166 are constructed and arranged to mate with corresponding fastening portions disposed on the heating elements or other objects to be inserted into pockets 142, 144.

FIG. 1 depicts modular heating elements 168, one in each of upper and lower pockets 142, 144. In this embodiment, loop portion 169 is attached to each modular heating element 168. Loop portion 169 cooperates with e.g. respective upper and lower hook portions 164, 166, previously described, to releasably secure modular heating elements 168 in place within pockets 142, 144. Heating elements can extend all the way to the rear of bag 100, if desired, or only partially to the rear.

Allowing heating elements 168 to be removed and replaced easily provides a number of advantages believed heretofore unknown. Many prior art bags, for example, must not be submerged in a cleaning solution or other liquid because damage to the heating elements likely would result. At the very least, extreme care must be taken to avoid exposing the heating elements to liquid. Folding, storing, packaging and/or otherwise manipulating or handling prior-art bags also can cause damage to the heating elements. Additionally, failure of a single heating element in the prior art compromises the entire bag, requiring expensive repair or, more practically, replacement of the entire bag. These and other disadvantages are believed to have caused unnecessary expense, delay, and other problems.

Modular heating elements suitable for use according to embodiments of the invention are available from a number of different manufacturers. Such heating elements can take the form of electrical resistance wires, for example, embedded or otherwise disposed in a substantially rectangular substrate of relatively stiff material, for example. Heating elements according to the invention also can include solid-sheet polymer technologies, e.g., such as carbon-containing MYLAR®-based integrated-circuit-type heater technologies, resistive-wire technologies, copper bus-bar technologies, and the like. Heating elements in the manner of those described in one or more of the above-identified U.S. patents also can be used. To maintain vapor-releasing characteristics of bag 100, heating elements according to the invention preferably are themselves at least partially moisture-permeable. Thus, undesirable moisture can escape not only through the sides of the bag but also through the roof and floor thereof, according to the illustrated embodiments. The heating elements can have holes and/or perforations therethrough, or can otherwise be moisture-permeable. For example, moisture can pass between the wires or other individual components making up a specific heating element.

Referring to FIG. 2, closure flap 114 according to this embodiment includes side portion 170 and tapered upper portion 172. Complimentary fastening portions 174, 176 are disposed, respectively, on an interior surface of upper portion 172 of flap 114 and on an exterior surface of upper panel 104. Fastening portions 174, 176 can comprise hook-and-loop fastening devices such as VELCRO, or other fastening mechanisms or devices.

Tapered upper portion 172 of closure flap 114 preferably comprises generally transparent window 178. Window 178 can be formed by stitching clear material 180 and binding 182 to material 154 of upper flap portion 172, e.g. along sides 184, 186 and bottom 188. Window 178 preferably opens along top edge 190 thereof, where clear material 180 and binding 182 are stitched together, but not to the underlying material of upper flap portion 172.

Window 178 preferably is a clear, flexible, transparent polyvinyl chloride film containing compatible, non-migrating plasticizers, such as polymeric adipate plasticizers, in addition to FDA-approved for food contact UV, thermal and oxidative stabilizer additives. Window 178 also can be made from 0.018 inch polypropylene, for example, or other suitable materials known to those skilled in the art.

Referring to FIGS. 1–2, lower panel 106 extends farther forward than upper panel 104, thereby forming an angled edge on first and second panels 110, 112. Further, material extending between closure flap 114 and side panels 110, 112 forms an overlapping and folding taper side seal when closure flap 114 is in its closed position, for better retaining heat within delivery bag 100. Binding 182, in addition to being disposed around the outside of flap 114, also can be used to join and/or border other portions of bag 100. Note, for example, FIG. 3.

As shown in e.g. FIG. 2, webbing 192 is stitched to first and second side panels 110, 112. Webbing 192 preferably extends from stitching joining side panels 110, 112 with lower panel 106. Webbing 192 extends from side panels 110, 112 to form straps 194, 196, 198, and 200. These straps preferably are stitched or otherwise connected at a central area above bag 100 to form handle 202. Webbing 192, straps 194–200 and handle 202 ideally are disposed and formed such that delivery bag 100 will be balanced when handle 202 is grasped. According to one embodiment, webbing 192 is 1½ inches wide.

Referring to FIGS. 4 and 5, bottom handle 210 is affixed to the exterior surface of lower panel 106 by stitching, for example. Bottom handle 210 can be made from webbing e.g. 3 inches in width, and has a length of about 7 inches in one embodiment. Handle 210 is generally centrally affixed to the exterior surface of lower panel 106, so that delivery bag 100 is generally balanced when lower handle 210 is used. Using lower handle 210 reduces the likelihood that pizzas, pizza slices or other food product will "rock" or otherwise undesirably move while the bag is being transported. Grabbing bag 100 solely by upper handle 202 may cause bag 100 to swing, e.g. while walking, causing the food product to shift. Either handle 202, 210 may be used separately or in combination when the delivery bag 100 is being carried. Lower panel 106, or any other desired portion of bag 100, also can include identifying indicia, care instructions or other information 212.

Power can be supplied to one or more heating elements 168 by e.g. electrical lead 223, shown in FIG. 1. Lead 223 preferably passes through an opening (not shown) in rear panel 108 and can terminate in quick release connector 224. Quick release connector 224 couples to a connector 225 on power cord 226. Plug 227 is present on the other end of power cord 226 and fits into an automobile's cigarette lighter, according to this embodiment.

Also as shown in FIG. 1, generally at 228, a bottom seam of floor pocket 144 can be open and angled, exposing heating element 168 and allowing a user of bag 100 to verify presence and proper disposition of heating element 168 within pocket 144.

Graphical and other data in connection with embodiments of the invention now will be described with respect to FIGS. 6–14.

The data presented in FIG. 6 show temperature and humidity characteristics for vinyl bags of the prior art vs. bags according to embodiments of the invention, each of the latter incorporating a different insulating material. Specifically, FIG. 6 shows interior temperature changes at 20 and 40 minutes after insertion of a representative food product and closure of the flap, and an overall humidity rating. As shown, polyester 12.33-ounce is a desirable insulating material. Polyester 9-ounce is a potentially acceptable second choice, assuming the noted four degree temperature difference at 20 minutes is not disqualifying. At the opposite end of the spectrum, vinyl and THINSULATE brand insulation generally would be considered unsatisfactory due to unacceptable moisture retention.

FIG. 7 depicts laboratory test results showing temperature readings for two pizzas stacked in a bag according to an embodiment of the invention. FIG. 8 shows temperature readings for a delivery bag of the prior art. More specifically, the results in FIG. 7 were taken using a bag having inner and outer fabric layers of breathable nylon with a polyester fiberfill insulation, as described above. Modular heating elements generally as described herein were present in the upper and lower pockets. The modular heater used a 12 Volt electric source to attain a final temperature of 185° F. after a 10 minute warm-up period. The two modular heating assemblies together weighed about 1 pound and the delivery bag weighed about 1.1 pound, for a total weight of about 2.1 pounds. The data in FIG. 8 were taken from readings in a delivery bag made from a cordura nylon with a THINSULATE layer. A heating element of the stored-heat-disc type used 110 Volt AC power to attain a final temperature of 160° F. after 60 minutes. As can be seen, the top pizza in the FIG. 7 cooled only 10° after 40 minutes, while the bottom pizza cooled 19°. The temperatures of the respective pizzas then maintained. With the FIG. 8 device, on the other hand, the top pizza cooled 21° and the bottom pizza cooled 18° in the same time frame, and continued to cool afterwards.

Figures 9, 10:
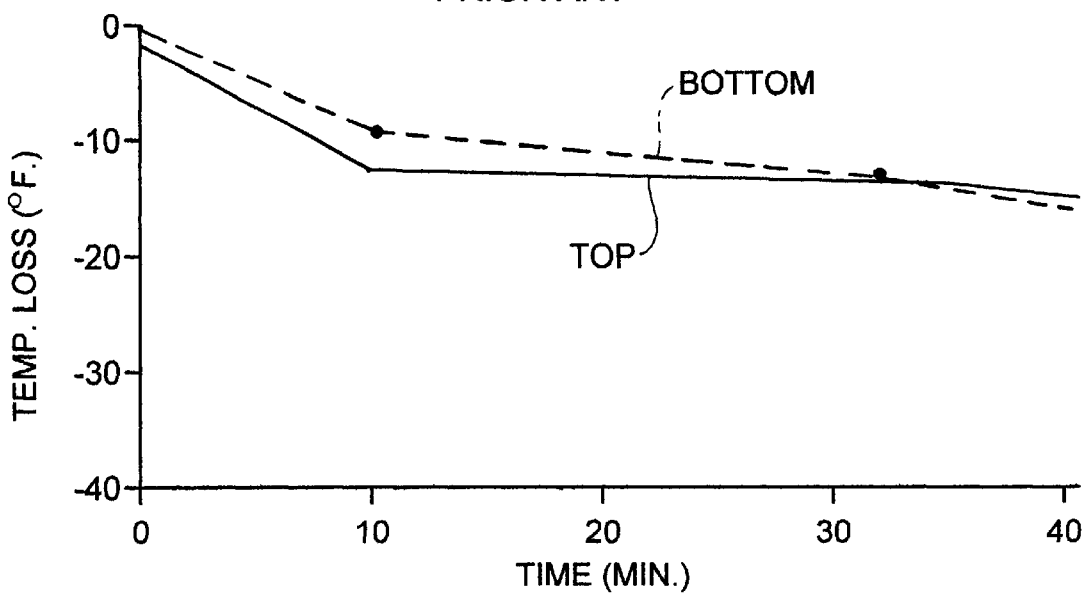
FIG. 9 is a graph of temperature loss vs. time for a typical bag.
FIG. 10 is a table showing temperature and humidity characteristics for a typical bag.
Figures 11, 12:
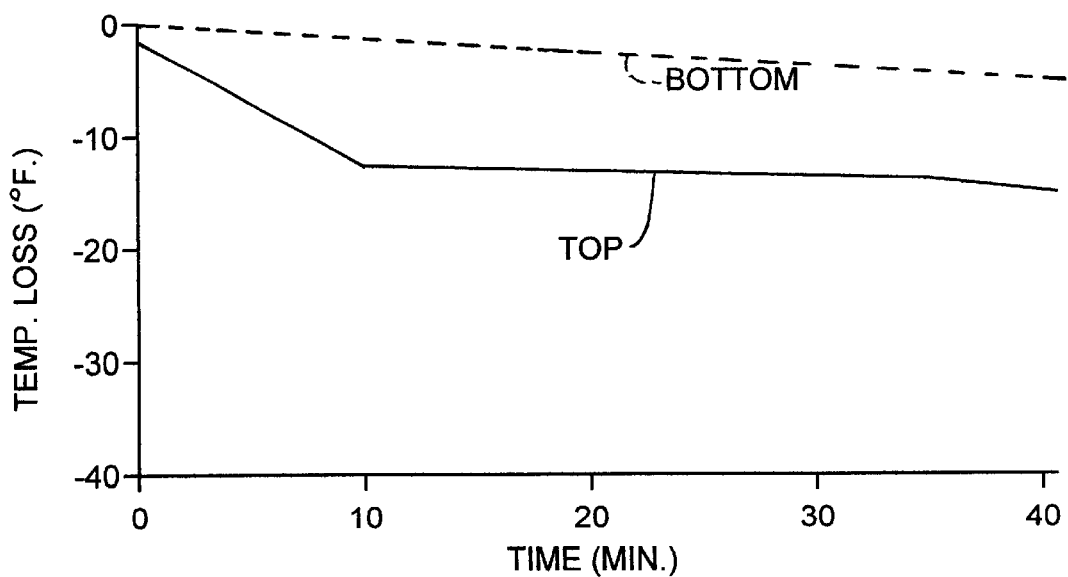
FIGS. 11–14 are graphs and tables showing temperature and humidity characteristics according to embodiments of the invention.

FIGS. 9 and 10 depict temperatures of top and bottom pizzas and relative humidities taken in a prior-art vinyl bag without a heater. FIGS. 11 and 12 show the same data for a delivery bag according to an embodiment of the invention with at least one heating element, relative humidity being measured using a hydrometer in the heated bag. As can be seen by comparing FIGS. 9 and 10 with FIGS. 11 and 12, the bag according to the invention better retained heat within the tested time interval. Moreover, the bag according to the invention facilitated an advantageous decline in relative humidity, while the prior art bag retained virtually all humidity. This decline is believed due, at least in part, to the breathable structures used according to the invention, and/or the thermal output of the at least one heating element, and/or direct moisture escape due to the non-sealed nature of the bag. Excess humidity, of course, can cause a number of disadvantages, such as damp or wet pizza boxes or other food containers, soggy pizza crust or other food product, moisture-saturated delivery bag material, mildew, odor, etc.

Figure 13:
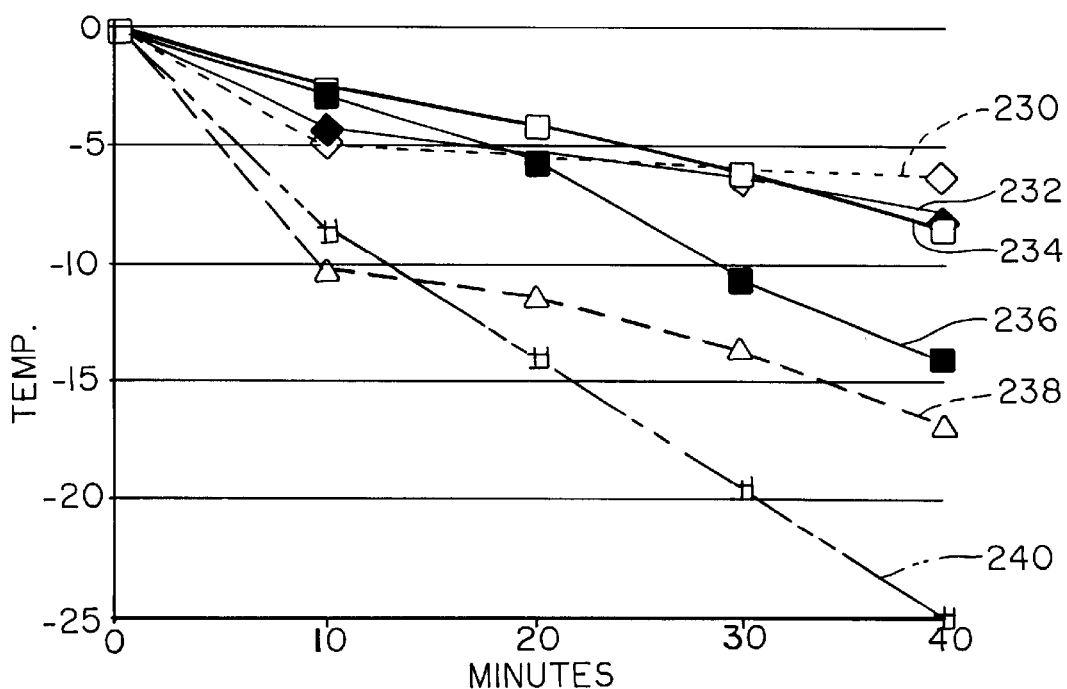

FIG. 13 shows delivery bag heat loss for different bag-heater combinations, the bag enclosing at least one pizza. The pizza used in this instance was a PAN SUPREME brand pizza available from Pizza Hut, Inc. Curve 230 (white-diamond) depicts a bag according to an embodiment of this invention with a first type of modular heating element. Curve 232 (black-diamond) represents a bag according to an embodiment of the invention with a second type of modular heating element. Curve 234 (white-square) represents a bag according to an embodiment of the invention with a third type of modular heating element. Curve 236 (black-square) represents a bag with a fourth type of heating element. Curve 238 (white-triangle) represents a prior-art vinyl bag without a heating element. Curve 240 (crosshatched-square) represents an empty bag. As can be seen, the temperature loss was minimized when the first three modular heating elements were used. Therefore, a number of different heating elements may be suitable within the context of this invention.

Figure 14:
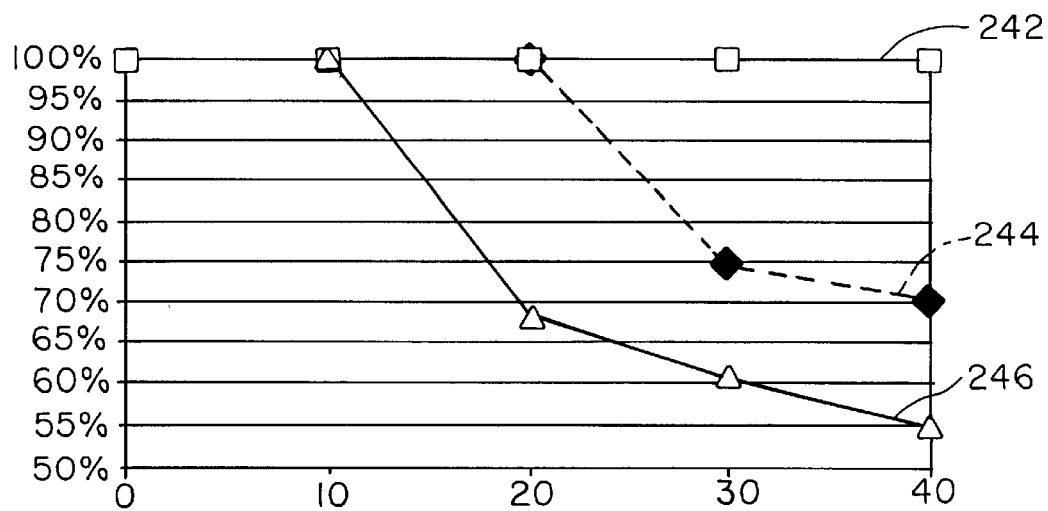

FIG. 14 shows humidity levels for types of heaters used in a bag according to an embodiment of the invention, the bag enclosing at least one pizza. A PAN SUPREME brand pizza available from Pizza Hut, Inc. was used in this instance. Curve 242 (white-square) represents a vinyl, prior-art bag and/or a bag with a prior-art heating element. Curve 244 (black-diamond) represents a bag according to an embodiment of this invention with a second type of modular heating element. Curve 246 (white-triangle) represents a bag according to an embodiment of this invention with a third type of modular heating element. While differences between types of modular heaters where shown, FIG. 14 clearly depicts the advantageous decrease in relative humidity over time when a bag according to the invention is used.

According to embodiments of the invention, relative humidity within delivery bag 100 decreases, tending to prevent undesirable sogginess in the crust of a pizza contained in the bag. Additionally, the materials of the bag itself do not emit toxic or undesirable substances and do not absorb (or adsorb) excess water. Thus, mold, mildew, and other adverse effects are generally reduced, if not avoided entirely. Additionally, the present delivery bag can be easily and effectively cleaned.

Relative humidities in the interior of a delivery bag according to an embodiment of the invention drop to a more desirable level, for example to a range between about 40% and 60%, and/or to a range between about 55% and 70%, more specifically, to a range between about 55% and 60%, and yet more specifically, to about 55%, over the time periods depicted in e.g. FIG. 14. Additionally, also unlike many prior art bags, temperature characteristics are maintained at a desirable level over an extended period of time. For example, temperature loss is maintained within a range of between about 0–10° F. over a time of up to about 40 minutes. More specifically, temperature loss may be maintained within a range of about 3–6° F. at a time-from-start period of between about 10–30 minutes (see FIG. 13). Maintaining heat, while releasing excess humidity, provides significant advantages over the bags of the prior art.

Because numerous modifications of this invention may be made without departing from the spirit thereof, the scope of the invention is not to be limited to the embodiments illustrated and described. For example, although one embodiment of the disclosed bag can have interior dimensions of about 18 inches by 18 inches by 6 inches, any suitable dimensions are contemplated. A variety of color schemes are contemplated, e.g. red for exterior surfaces and black for interior surfaces. Embodiments of the invention are not necessarily limited to transporting pizza products or even food products. Other modifications and variations will be apparent to those of ordinary skill.

What is claimed is:

1. A portable container for transporting food, the portable container comprising:
   an enclosure, the enclosure having an openable section, the openable section being movable from an open position, in which food can be placed into the enclosure for transport and in which food can be removed from the enclosure, and a closed position;
   at least one pocket connected to the enclosure; and
   at least one modular heating element disposed within the at least one pocket, the at least one modular heating element being readily removable from the pocket for use in a different, generally identical portable container, the at least one modular heating element providing thermal energy to food disposed within the enclosure;
   wherein the container comprises a plurality of pockets connected to the enclosure, at least one modular heating element being disposed within each of the plurality of pockets, the modular heating elements being readily removable from the respective pockets.

2. The container of claim 1, wherein the enclosure is constructed to allow passage of moisture therethrough.

3. The container of claim 2, wherein the enclosure is constructed to wick moisture from the inside of the enclosure to the outside of the enclosure.

4. The container of claim 1, wherein the at least one modular heating element is constructed to allow passage of moisture theretrough.

5. The container of claim 1, wherein the at least one modular heating element is powered by electricity, the at least one modular heating element further comprising a power cord extending out of the container for connection to a source of electricity.

6. A method of transporting food, the method comprising:
   providing an enclosure, the enclosure having an openable section, the openable section being movable from an open position, in which food can be placed into the enclosure for transport and in which food can be removed from the enclosure, and a closed position;
   moving the openable section to the open position;
   placing food within the enclosure for transport;
   providing at least one pocket connected to the enclosure, the pocket opening away from the openable section of the enclosure;
   moving the openable section to the closed position; and
   transporting food in the enclosure.

7. The method of claim 1, further comprising:
   removing the at least one modular heating element from the pocket; and
   placing the at least one modular heating element in a pocket of a different, generally identical portable container.

8. A portable container for transporting food, the portable container comprising:
   means for enclosing food, the means for enclosing comprising means for opening such that food can be placed within the means for enclosing and can be removed from the means for enclosing; and
   means for accommodating modular means for heating; the means for accommodating being connected to the means for enclosing, the means for accommodating being constructed such that modular means for heating is readily removable from the means for accommodating for use in a different, generally identical portable container, the means for accommodating comprising at least two distinct pockets within the means for enclosing.

9. A portable container for delivering food, the portable container comprising:
   an upper panel, a lower panel, a rear panel, a first side panel, a second side panel, and a closing flap, wherein said rear panel, said first side panel and said second side panel all extend between said upper panel and said lower panel, further wherein at least said upper panel, said lower panel, said rear panel, said first side panel, and said second side panel all comprise a substantially flexible and moisture-permeable insulating panel material and all define interior and exterior surfaces; and
   a first pocket defining a first pocket opening and disposed proximate the interior surface of at least one of the upper, lower, rear, and first and second side panels, wherein the first pocket opens toward the rear panel.

10. The container of claim 9, further comprising a modular heating element disposed in the first pocket.

11. The container of claim 10, in which the panel material and the heating element cooperate such that relative humidity within the container decreases from about 100% to between about 40% and about 60% over a time period of about 40 minutes while the closing flap is in a closed position.

12. The container of claim 11, in which the panel material and the heating element cooperate such that temperature within the container decreases by no more than about 10 Fahrenheit degrees in a time period of about 40 minutes while the closing flap is in a closed position.

13. The container of claim 10, in which the panel material and the heating element cooperate such that relative humidity within the container decreases from about 100% to between about 55% and about 70% over a time period of about 40 minutes while the closing flap is in a closed position.

14. The container of claim 10, in which the panel material and the heating element cooperate such that relative humidity within the container decreases from about 100% to between about 55% and about 60% over a time period of about 40 minutes while the closing flap is in a closed position.

15. The container of claim 10, in which the panel material and the heating element cooperate such that relative humidity within the container decreases from about 100% to about 55% over a time period of about 40 minutes while the closing flap is in a closed position.

16. The container of claim 9, the panel material including an interior fabric, an exterior fabric, and an insulating fabric disposed between the interior and exterior fabrics.

17. The container of claim 16, wherein the interior and exterior fabrics comprise nylon and the insulating fabric comprises polyester.

18. A portable container for delivering food, the portable container comprising:
   an upper panel, a lower panel, a rear panel, a first side panel, a second side panel, and a closing flap, wherein said rear panel, said first side panel and said second side panel all extend between said upper panel and said lower panel, further wherein at least said upper panel, said lower panel, said rear panel, said first side panel, and said second side panel all comprise a substantially flexible and moisture-permeable insulating panel material and all define interior and exterior surfaces;

a first pocket defining a first pocket opening and disposed proximate the interior surface of at least one of the upper, lower, rear, and first and second side panels; and a second pocket, the second pocket defining a second pocket opening, the first pocket disposed proximate the interior surface of the lower panel, the second pocket disposed proximate the interior surface of the upper panel.

19. The container of claim 18, further comprising first and second modular heating elements disposed in said respective first and second pockets.

20. The container of claim 19, in which the first and second modular elements are vapor-permeable.

21. The container of claim 9, further comprising a fastener portion disposed in the first pocket and fixed to the interior surface of said at least one panel.

22. The container of claim 9, in which the fastener portion is a hook portion of a hook-and-loop fastener or a loop portion of a hook-and-loop fastener.

23. A method of maintaining a pizza at a desired temperature and moisture content during delivery, comprising:

providing a portable container, the container including an upper panel, a lower panel, a rear panel, first and second side panels, a closing flap, a pocket and a modular heater, said rear and first and second side panels extending between the upper panel and the lower panel, the flap extending from the lower panel, the upper, lower, rear, first and second side panels and flap including a substantially flexible insulating panel material including interior and exterior surfaces, the panel material capable of allowing moisture to pass from an interior of the container to an exterior of the container, the pocket defining a pocket opening and disposed proximate the interior surface of one of the upper, lower, rear, and side panels, the modular heater disposed in the pocket, the pocket opening facing the rear panel;

placing the pizza in the container;

closing the flap;

providing electricity to the modular heater; and maintaining a desired temperature and moisture content within the portable container.

24. The method of claim 23, in which a pair of pizzas are placed in the container.

25. The method of claim 23, further comprising decreasing relative humidity within the container to between about 40% and about 60% over a time period of about 40 minutes while the flap is closed.

26. The method of claim 23, further comprising decreasing relative humidity within the container to about 55% over a time period of about 40 minutes while the flap is closed.

27. The container of claim 18, wherein the first pocket opens toward the rear panel.

28. The container of claim 27, wherein the second pocket opens toward the rear panel.

29. The container of claim 18, wherein the first pocket extends along the upper panel toward the rear panel but stops short of the rear panel.

30. The container of claim 18, wherein the container defines space for holding food between the first and second pockets.

31. The method of claim 6, further comprising providing at least one modular heating element disposed within the at least one pocket, the at least one modular heating element being readily removable from the pocket, and providing thermal energy to food disposed within the enclosure with the at least one modular heating element.

32. The method of claim 6, wherein the at least one pocket comprises two distinct pockets.

33. A method of transporting food, the method comprising:

providing an enclosure, the enclosure having an openable section, the openable section being movable from an open position, in which food can be placed into the enclosure for transport and in which food can be removed from the enclosure, and a closed position;

providing two distinct pockets within the enclosure;

moving the openable section to the open position;

placing food for transport within the enclosure between the pockets;

moving the openable section to the closed position; and transporting food in the enclosure.

34. The method of claim 33, wherein the two pockets open toward a rear of the enclosure away from the openable section.

35. The container of claim 8, wherein the at least two pockets open away from the means for opening toward a rear of the means for enclosing.

36. A portable container for transporting food, the portable container comprising:

an enclosure, the enclosure having an openable section, the openable section being movable from an open position, in which food can be placed into the enclosure for transport and in which food can be removed from the enclosure, and a closed position; and at least two distinct pockets within the enclosure.

37. The container of claim 36, wherein the pockets open away from the openable section of the enclosure.

38. A portable container for transporting food, the portable container comprising:

an enclosure, the enclosure having an openable section, the openable section being movable from an open position, in which food can be placed into the enclosure for transport and in which food can be removed from the enclosure, and a closed position; and at least one pocket within the enclosure, the at least one pocket opening away from the openable section of the enclosure.

* * * * *

UNITED STATES PATENT AND TRADEMARK OFFICE
CERTIFICATE OF CORRECTION

PATENT NO.   : 6,281,477 B1  
DATED        : August 28, 2001  
INVENTOR(S)  : Robert Forrester and Homero Ortegon It is certified that error appears in the above-identified patent and that said Letters Patent is hereby corrected as shown below:

<u>Column 6,</u>
Line 60, has been changed such that a new paragraph begins at "Referring".

Signed and Sealed this

Fourth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,281,477 B1
DATED : August 28, 2001
INVENTOR(S) : Robert Forrester and Homero Ortegon It is certified that error appears in the above-identified patent and that said Letters Patent is hereby corrected as shown below:

<u>Column 11,</u>
Line 57, "1" has been changed to -- 31 --.

Signed and Sealed this

Fifth Day of August, 2003

JAMES E. ROGAN
*Director of the United States Patent and Trademark Office*